(No Model.)

J. D. McCURDY.
WASHING MACHINE.

No. 432,548. Patented July 22, 1890.

Witnesses.
W. H. Blodgett,
W. E. Norton.

Inventor.
John D. McCurdy
By his Attorneys.
Williamson & Blodgett

UNITED STATES PATENT OFFICE.

JOHN D. McCURDY, OF MINNEAPOLIS, MINNESOTA, ASSIGNOR OF ONE-HALF TO GILMAN E. HANNUM, OF SAME PLACE.

WASHING-MACHINE.

SPECIFICATION forming part of Letters Patent No. 432,548, dated July 22, 1890.

Application filed March 8, 1890. Serial No. 343,131. (No model.)

*To all whom it may concern:*

Be it known that I, JOHN D. MCCURDY, a citizen of the United States, residing at Minneapolis, in the county of Hennepin and State of Minnesota, have invented certain new and useful Improvements in Washing-Machines; and I do hereby declare the following to be a full, clear, and exact description of the invention, such as will enable others skilled in the art to which it appertains to make and use the same.

My invention relates to washing-machines of the kind in which vibrating rubbing-surfaces are employed, and has for its object the provision of an attachment whereby the rubber can readily be supported in an elevated or draining position within the tub. With this end in view I provide a semicircular box or tub having the upper edges of its sides cut down to form a V-shaped recess. On the top of each side near one end I place a bearing, and in these bearings mount a rod bent at right angles upon itself to form a cross-bar and two projecting arms. To each of these arms I pivot a bar having an inwardly-projecting forward end, which engages with a bearing-plate in the side of the rubber. In virtue of this construction the bent ends of the bars rest upon the bearings in the side plates, and when the machine is in use the rubber is swung back and forth on said ends.

When the machine is not in use and it is desired to place the rubber in a position to drain, the rubber is lifted and swung back to fold the bars upon the arms.

Figure 1:
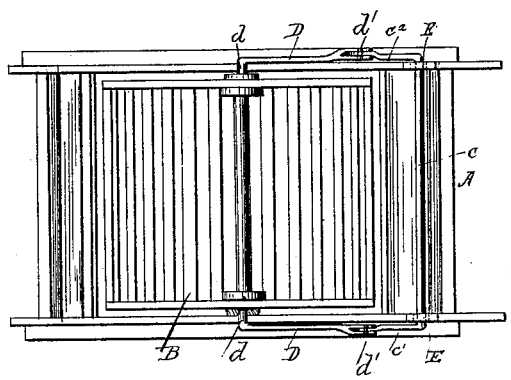
Figure 2:
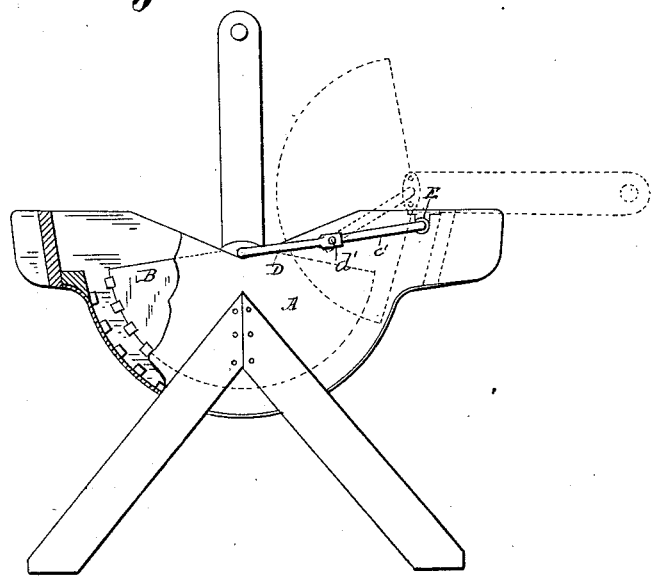

Reference being had to the accompanying drawings, in which like letters are placed on like parts throughout the views, Figure 1 is a plan view of a machine embodying my improvements; and Fig. 2 is a side elevation thereof, partially in section.

A is a semicircular box or tub, and B is an oscillating rubber of the usual form.

C is a rod bent upon itself to provide a cross-bar $c$ and arms $c'$ $c^2$, and D D are bars having inwardly-bent ends $d$ $d$, pivoted at $d'$ to said arms.

E E are bearings for cross-bar $c$. Dotted lines in Fig. 2 indicate the position of the parts when the rubber is in its draining position.

Having described my invention, what I claim, and desire to secure by Letters Patent, is—

1. A tub provided with bearings, in combination with a cross-bar mounted in the bearings and provided with arms, bars pivoted to the arms, and a rubber mounted to swing on said bars, substantially as and for the purpose specified.

2. In a washing-machine, the combination, with the tub having a V-shaped recess and a bearing in each of the side walls, of a cross-bar journaled in the bearings, bars having inwardly-bent ends articulated to arms projecting from the cross-bar, and a rubber journaled on the ends, substantially as and for the purpose specified.

In testimony whereof I affix my signature in presence of two witnesses.

JOHN D. McCURDY.

Witnesses:
GEORGE A. GOODSON,
WM. H. BLODGETT.